(12) United States Patent
Akada et al.

(10) Patent No.: US 7,466,910 B2
(45) Date of Patent: Dec. 16, 2008

(54) OPTICAL DEVICE AND CAMERA SYSTEM (75) Inventors: Hiroshi Akada, Kawasaki (JP);
Masanori Ishikawa, Saitama (JP); Jun Sugita, Sagamihara (JP); Katsuhiro Inoue, Utsunomiya (JP); Sawako Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 11/829,576

(22) Filed: Jul. 27, 2007

(65) Prior Publication Data
US 2008/0031605 A1 Feb. 7, 2008

(30) Foreign Application Priority Data
Aug. 4, 2006 (JP) ............................. 2006-213782

(51) Int. Cl.
G03B 17/00 (2006.01)
G02B 27/64 (2006.01)
H04N 5/228 (2006.01)

(52) U.S. Cl. ...................... 396/55; 359/554; 348/208.99

(58) Field of Classification Search ............. 396/52–55; 359/554; 348/208.99
See application file for complete search history.

(56) References Cited

U.S. PATENT DOCUMENTS
6,343,188 B1 * 1/2002 Morofuji .................... 396/55

FOREIGN PATENT DOCUMENTS
JP    11-212133     8/1999
JP    2004-258250   9/2004
JP    2005-181712   7/2005
JP    2005-227329   8/2005

* cited by examiner

Primary Examiner—Melissa J Koval
(74) Attorney, Agent, or Firm—Canon USA Inc I.P. Div

(57) ABSTRACT

An optical device includes a base member, an image-stabilizing lens, a lens holding member mounted to the base member and configured to hold the image-stabilizing lens, a driving unit configured to drive the lens holding member in a direction orthogonal to an optical axis, a plurality of elastic members fixed between the base member and the lens holding member, a vibration detecting unit configured to detect vibration, and a control circuit configured to control the position of the lens holding member on the basis of vibration information from the vibration detecting unit. The center position of the driving range of the image-stabilizing lens is controlled on the basis of vibration information obtained during a predetermined period between the time when a first trigger signal is input and the time when a second trigger signal is input.

6 Claims, 8 Drawing Sheets

OPTICAL DEVICE AND CAMERA SYSTEM

BACKGROUND OF THE INVENTION

1. Field of the Invention

The present invention relates to a lens having an image stabilizing function, and an optical device, such as a camera, and a camera system including the lens.

2. Description of the Related Art

Japanese Patent Laid-Open No. 2004-258250 proposes an image-stabilizing device in which an image stabilizing unit is returned to its initial position when it is determined that the image stabilizing unit reaches the edge of a region in which the image stabilizing unit can be driven for image stabilization.

In this image-stabilizing device, the initial position is set at a position shifted from the center of an image stabilization range by an estimated amount of movement during exposure.

Japanese Patent Laid-Open No. 2005-181712 proposes an image-stabilizing device (image-stabilizing camera system) in which image stabilization is performed according to past vibration pattern information acquired during image-capturing operations of an operation member.

In the image-stabilizing device disclosed in the first publication, however, when it is determined that the image-stabilizing unit reaches the edge of the range in which it can be driven for image stabilization, the image-stabilizing unit is returned to its initial position shifted from the center of the image stabilization range by the estimated amount of movement during exposure.

For this reason, depending on the estimated amount of movement, the driving stroke in the direction toward the edge of the image stabilization range is decreased by shifting by the estimated amount of movement.

If vibration actually occurs in a direction opposite to the predicted direction, the image stabilization range becomes extremely narrow. Consequently, it is difficult to properly correct vibration.

In the image-stabilizing device disclosed in the second publication, image stabilization control is exerted according to the past vibration pattern information. Therefore, when the image-stabilizing device is used in a situation different from that of the past pattern, a sufficient image-stabilizing performance is not ensured during image capturing.

In order to overcome this problem, selection switches or the like are provided corresponding to a plurality of vibration patterns. However, it is troublesome to operate the selection switches. Further, if the operator fails to perform switching, image-capturing is continued without sufficient image-stabilizing performance.

In the above-described known image-stabilizing devices, power consumption for image stabilization is high, and therefore, battery power tends to be consumed at a high rate.

SUMMARY OF THE INVENTION

The present invention provides an optical device and a camera system in which image stabilization can be properly performed even when an unexpectedly large vibration occurs between an image-capturing preparatory state and an image-capturing state.

An optical device according to an aspect of the present invention includes a base member; an image-stabilizing lens; a lens holding member mounted to the base member and configured to hold the image-stabilizing lens; a driving unit configured to drive the lens holding member in a direction orthogonal to an optical axis; a plurality of elastic members fixed between the base member and the lens holding member; a vibration detecting unit configured to detect vibration; and a control circuit configured to control the position of the lens holding member on the basis of vibration information from the vibration detecting unit. The center position of the driving range of the image-stabilizing lens is controlled on the basis of vibration information obtained during a predetermined period between the time when a first trigger signal is input to and the time when a second trigger signal is input.

Further features of the present invention will become apparent from the following description of exemplary embodiments with reference to the attached drawings.

DESCRIPTION OF THE EMBODIMENTS

Exemplary embodiments of the present invention will now be described with reference to the drawings.

First Exemplary Embodiment

First, a description will be given of a configuration of a camera system including a camera and an interchangeable lens in which an image-stabilizing unit according to a first exemplary embodiment of the present invention is mounted.

Figure 1:
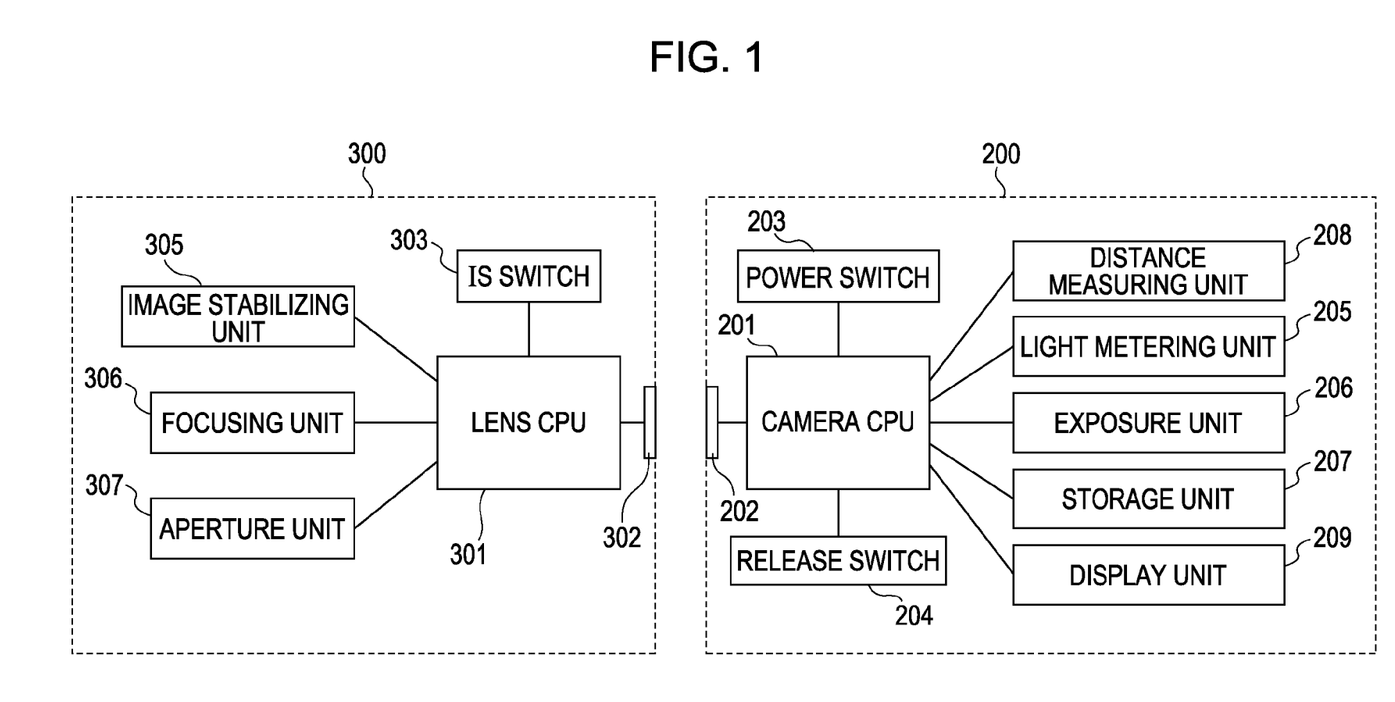
FIG. 1 is a block diagram showing a configuration of an autofocus (AF) single-lens reflex camera (including an interchangeable lens system) in which an image-stabilizing unit according to a first embodiment of the present invention is mounted.

FIG. 1 is a block diagram showing a configuration of an autofocus (AF) single-lens reflex camera (including an interchangeable lens system) in which an image-stabilizing unit is mounted.

As shown in FIG. 1, a camera body 200 includes a camera CPU 201 formed by a microcomputer. The camera CPU 201 controls the operations of various units 205, 206, 207, 208, and 209, which will be described below, provided in the camera body 200.

An interchangeable lens body 300, which will be described below, is detachably mounted on the camera body 200. When mounting the interchangeable lens body 300 on the camera body 200, a lens contact 302 and a camera contact 202 are connected so that data can be exchanged between the interchangeable lens body 300 and the camera CPU 201.

A power switch 203 in the camera body 200 can be operated externally, and serves to start up the camera CPU 201 so that power can be supplied to actuators, sensors, and so on in the system and the system can operate.

A release switch 204 in the camera body 200 is a two-stroke release switch that can be operated externally. A signal to turn on each stroke switch is input to the camera CPU 201.

That is, when a first stroke switch of the release switch 204 is ON, a command for transit to an image-capturing preparatory state (first trigger signal SW1) is output. When a second stroke switch of the release switch 204 is ON, a command for transit to an image capturing state (second trigger signal SW2) is output. The stroke with which the second stroke switch is turned on is longer than the stroke with which the first stroke is turned on.

More specifically, when the first stroke switch of the release switch 204 is externally turned on (a trigger signal SW1 is output), the following operation is performed under control of the camera CPU 201 so as to bring about an image-capturing preparatory state.

That is, under control of the camera CPU 201, the exposure of a light metering unit 205 is determined, and focusing and focus checking are performed by a focusing unit, which will be described below, on the basis of the distance to a subject measured by a distance-measuring unit 208.

In contrast, when the second stroke switch is externally turned on (a trigger signal SW2 is output), the following various commands are output from the camera CPU 201, and an image-capturing state is brought about.

One of the commands output from the camera CPU 201 is a driving command input to the lens CPU 301 in the interchangeable lens body 300 so as to drive an aperture unit 307. Upon receiving this driving command, the lens CPU 301 drives the aperture unit 307, and transmits, to the camera CPU 201, a command to start exposure with an exposure unit 206 so that the exposure unit 206 performs an exposure operation.

Upon receiving an exposure end signal via the camera CPU 201, the lens CPU 301 transmits, to the camera CPU 201, a command to start recording in a storage unit 207 so that the storage unit 207 stores a captured image.

The camera CPU 201 controls the center position of an image-stabilization driving range of an image-stabilizing lens, which will be described below, on the basis of vibration information in a first period from when the first trigger signal SW1 is recognized to when the second trigger signal SW2 is recognized.

However, from a viewpoint of processing speed, it is preferable that the lens CPU 301 or an image-stabilizing unit 305 specifically control the center position of the image-stabilization driving range of the image-stabilizing lens.

Image stabilization can be performed by exerting control so that the center position is within a range between the optical axis of the image-stabilizing lens, which is held on elastic members by gravity, and the optical axis of the image-capturing optical system.

A display unit 209 displays various image-capturing conditions, such as the f-number, the shutter speed, the number of captured images, the charging state of the battery, and various modes according to instructions from the camera CPU 201. For example, the display unit 209 is a liquid crystal display.

An image stabilization switch (hereinafter referred to as an IS switch) 303 can be operated from the outside of the interchangeable lens body 300, and is used to select an image-stabilizing operation (hereinafter referred to as an IS operation) that will be described below (when the switch IS 303 is turned on, an IS operation is selected).

The image-stabilizing unit 305 in the interchangeable lens body 300 is roughly divided into the following four units. A first unit is an image-stabilizing optical system including an image-stabilizing lens and a lens holding member. A second unit is a driving unit that drives the image-stabilizing optical system. A third unit is a position detecting unit that detects the moving position of the image-stabilizing optical system. A fourth unit is a vibration detecting unit that detects the acceleration or speed of vibration in the vertical and horizontal directions and detects a vibration state to be corrected.

A focusing unit 306 in the interchangeable lens body 300 includes the following four units. A first unit includes a focusing lens and a lens holder. A second unit is a focusing-lens driving unit that drives the focusing lens to a target position. A third unit is a transmission mechanism that transmits the driving force of the focusing-lens driving unit as the force of moving the focusing lens. A fourth unit is a focusing-lens driving circuit that transmits a driving command to the focusing-lens driving unit controlled by the lens CPU 301 on the basis of information about the moving amount of the focusing lens sent from the camera CPU 201.

An aperture unit 307 in the interchangeable lens body 300 includes the following three units. A first unit is an aperture mechanism that sets the aperture area. A second unit is an aperture-mechanism driving unit that drives the aperture mechanism. A third unit is an aperture driving circuit that transmits a driving command to the aperture-mechanism driving unit controlled by the lens CPU 301 according to an aperture operation command sent from the camera CPU 201.

The lens CPU 301 and the image-stabilizing unit 305 constitute a control circuit that controls the position of a lens holding member, which will be described below, on the basis of vibration information from a vibration detecting unit that will be described below.

Figure 2:
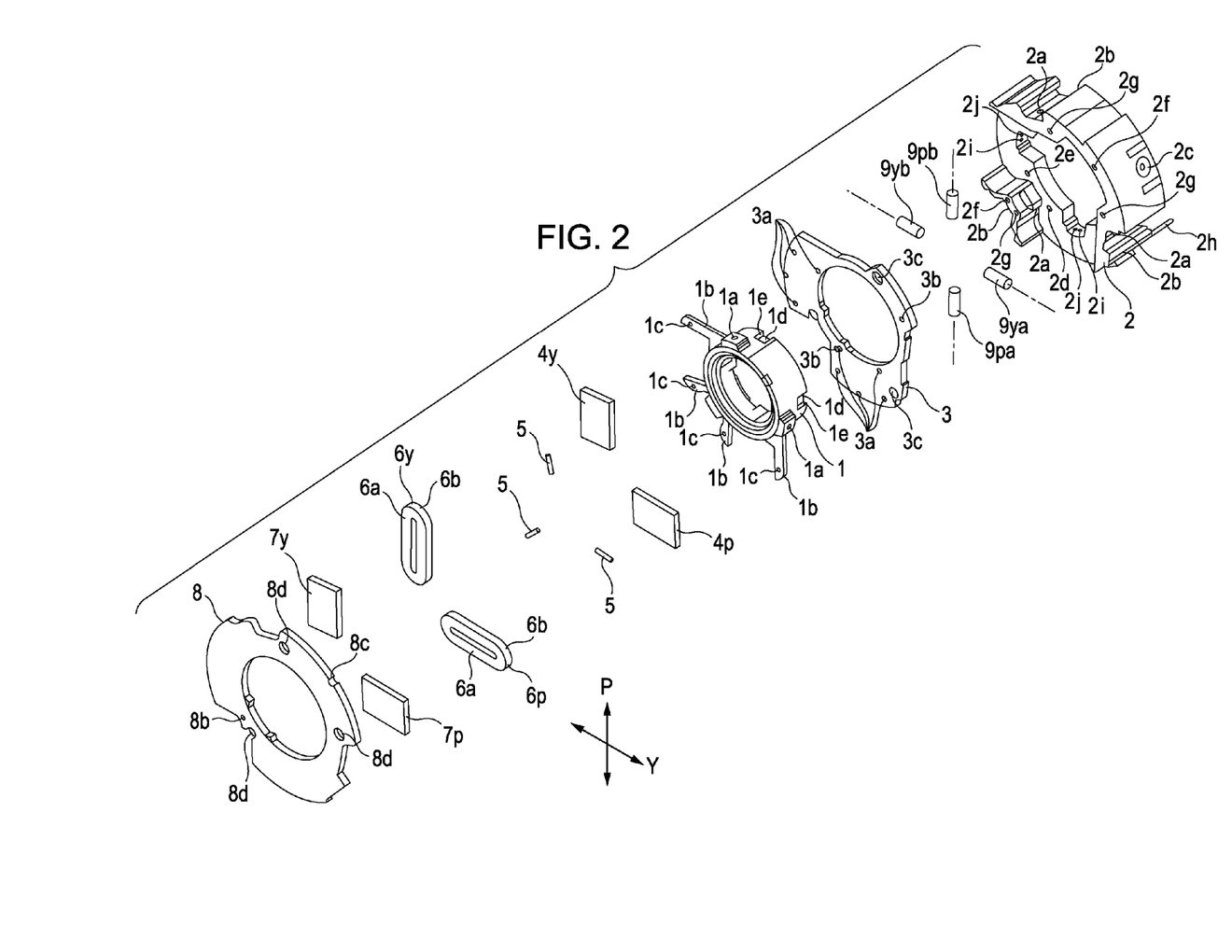
FIG. 2 is an exploded perspective view of the image-stabilizing unit.
Figure 3:
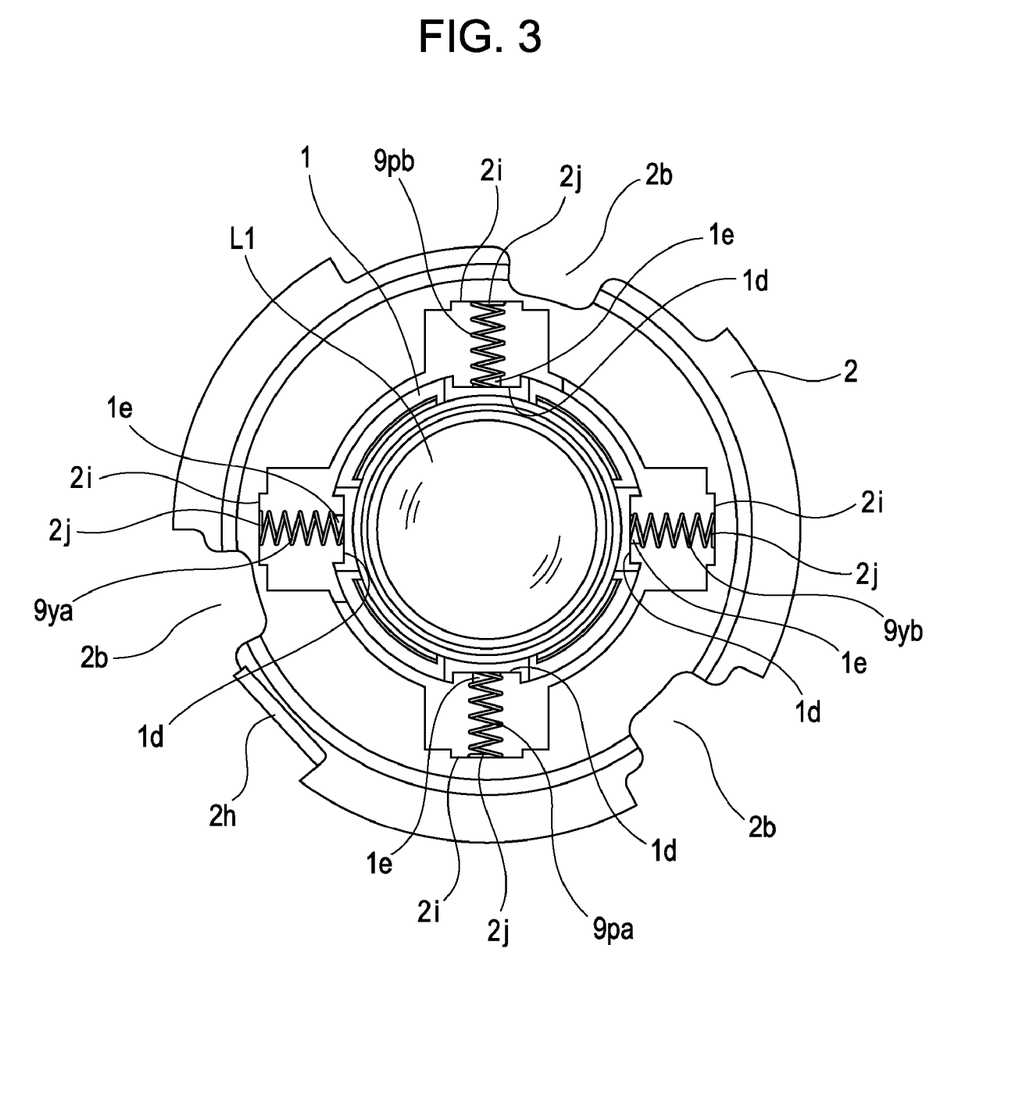
FIG. 3 is a front view of the image-stabilizing unit in an assembled state, as viewed from the direction of the optical axis.
Figure 4:
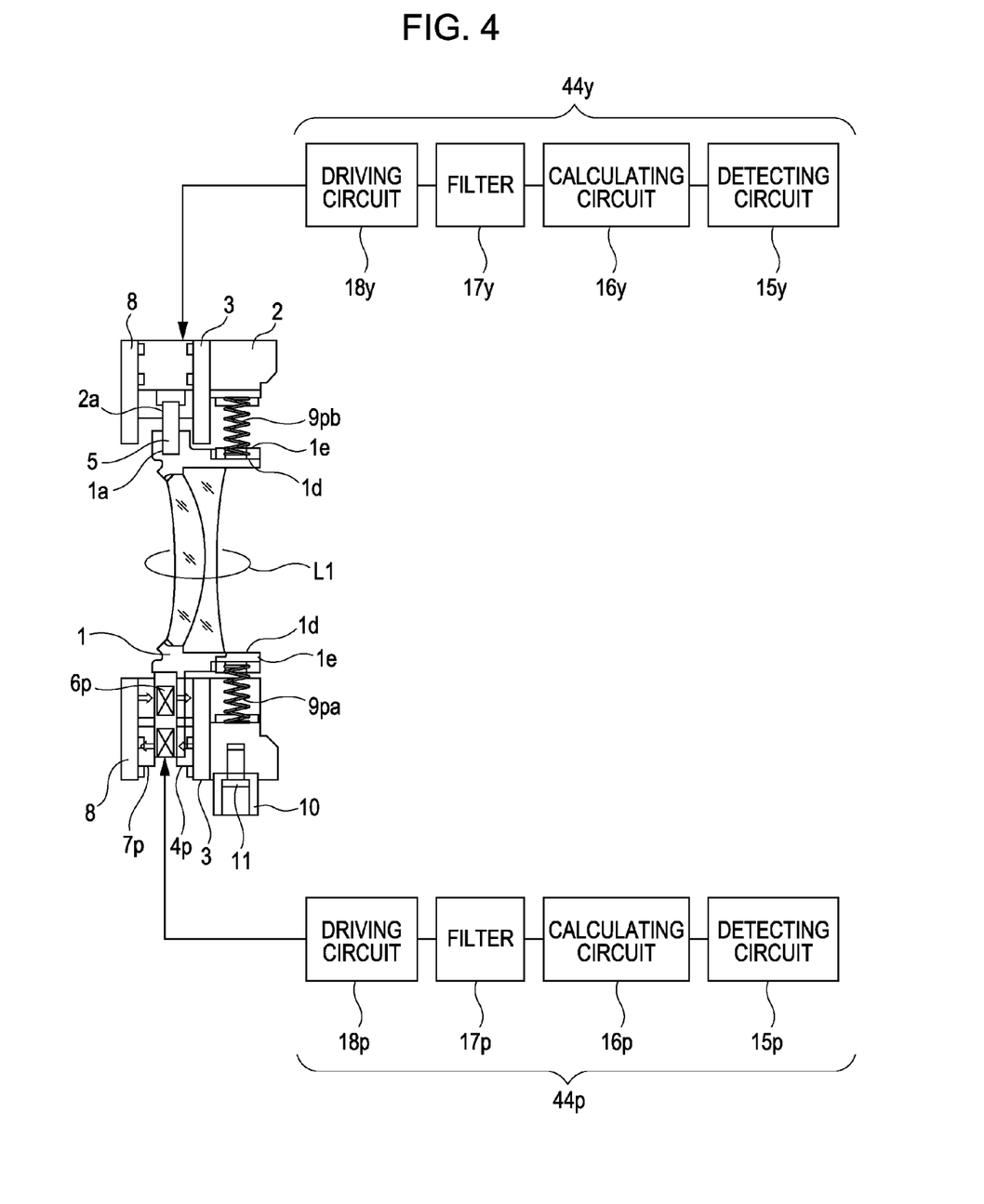
FIG. 4 is an explanatory view showing a driving control system, including a side view of the image-stabilizing unit in the assembled state, as viewed from a direction orthogonal to the optical axis.

FIG. 2 is an exploded perspective view of the image-stabilizing unit 305 in the first exemplary embodiment of the present invention. FIG. 3 is a front view of the image-stabilizing unit 305 in an assembled state, as viewed from the direction of the optical axis. FIG. 4 is an explanatory view showing a driving control system, including a side view of the image-stabilizing unit 305 in an assembled state, as viewed from a direction orthogonal to the optical axis. The image-stabilizing unit 305 will be described below with reference to FIGS. 2 to 4.

A cemented lens (image-stabilizing optical system, hereinafter referred to as an image-stabilizing lens) L1 shown in FIGS. 3 and 4 is fitted in a lens support frame (lens holding member) 1, and is fixed by caulking (see FIG. 3).

The lens support frame 1 can move two-dimensionally (in directions orthogonal to the optical axis) on a plane orthogonal to the optical axis relative to a base member (device body) 2 (see FIG. 3).

Three slide cams 2a are provided on the same plane orthogonal to the optical axis on the periphery of the base member 2, as shown in FIG. 2. Three metal slide pins 5 are respectively press-fitted in holes 1a provided in the lens support frame 1 through the slide cams 2a.

Thereby, the lens support frame 1 is connected to the base member 2 via the slide pins 5 and the slide cams 2a, and can move in all directions on the plane orthogonal to the optical axis while the position thereof is substantially regulated in the optical-axis direction.

Play between the slide pins 5 and the slide cams 2a (that is, play of the lens support frame 1 in the optical-axis direction) can be corrected by adjusting the thickness of the slide pins 5.

As shown in FIG. 2, the outer diameter of the base member 2 is decreased at three positions so as to form recesses 2*b*, and the slide cams 2*a* are respectively provided on inner sides of the recesses 2*b*.

Other members can be placed in the recesses 2*b* so as to connect members disposed on the front and rear sides of the image-stabilizing unit 305 in the lens barrel or the camera.

Three support holes 2*c* are provided on an outer peripheral surface of the base member 2, and allow the image-stabilizing unit 305 to be supported in the optical device. The image-stabilizing unit 305 can be supported in the optical device by placing other members, such as rollers 10 shown in FIG. 4, in the support holes 2*c* and fastening the rollers 10 by screws 11.

When play of the lens support frame 1 in the optical-axis direction is corrected by changing the thickness of the slide pins 5, as described above, the lens support frame 1 may tilt relative to the optical axis.

However, when one or two of the three rollers 10 are formed of eccentric rollers, the entire image-stabilizing unit 305 can tilt relative to the optical axis of the optical device simply by rotating the eccentric rollers.

For this reason, it is sufficiently possible to reduce practical trouble by correcting the tilting of the lens support frame 1 relative to the optical axis and to adjust the lens support frame 1 relative to the optical axis by making best use of the eccentric rollers.

As shown in FIG. 2, first magnets 4*p* and 4*y* are fixed to a first yoke 3 by magnetic coupling. Second magnets 7*p* and 7*y* are magnetically connected to a second yoke 8.

The positions of the first magnets 4*p* and 4*y* are regulated by projections 3*a* provided on the first yoke 3, and the positions of the second magnets 7*p* and 7*y* are regulated by projections (not shown) similarly provided on the second yoke 8.

Each of the magnets 4*p*, 4*y*, 7*p*, and 7*y* is magnetized in different directions between a side close to the optical axis and a side remote from the optical axis, and has a nonmagnetic region near the center thereof.

This is because driving force is efficiently produced by aligning windings of coils 6*p* and 6*y* opposing the magnets 4*p*, 4*y*, 7*p*, and 7*y* in the optical-axis direction with the magnetic regions of the magnets 4*p*, 4*y*, 7*p*, and 7*y*.

While the magnetizing directions of the magnets 4*p*, 4*y*, 7*p*, and 7*y* are shown by the arrows in FIG. 4, they will be described in detail below.

As shown in FIG. 2, the first yoke 3 is positioned relative to the base member 2 by fitting two projections 2*d* provided on the base member 2 in two holes 3*b* provided in the first yoke 3.

Further, the first yoke 3 is fixed to the base member 2 by inserting and tightening screws (not shown) into three holes 3*c* provided therein and three holes 2*e* provided in the base member 2.

During a production process, the first yoke 3 is fixed to the base member 2 before the slide pins 5 are press-fitted in the lens support frame 1.

The second yoke 8 is positioned relative to the base members 2 by fitting two projections 2*f* provided on the base member 2 into holes 8*b* and recesses 8*c* provided in the second yoke 8.

Further, the second yoke 8 is fixed to the base member 2 by inserting and tightening screws (not shown) into three holes 8*d* provided therein and three holes 2*g* provided in the base member 2.

Each of the coils 6*p* and 6*y* includes a winding portion 6*a* in which a conductive material is wound, and a resin support portion 6*b* at which the coil 6*p* or 6*y* is fixed to the lens support frame 1.

The coils 6*p* and 6*y* are positioned relative to the lens support frame 1 by fitting projections 1*c* of the lens support frame 1 into holes (not shown) provided in the support portions 6*b* in a state in which the support portions 6*b* are in contact with arms 1*b* provided in the lens support frame 1.

Further, the coils 6*p* and 6*y* are fixed to the lens support frame 1 by bonding the support portions 6*p* to the lens support frame 1.

In the first embodiment, the coils 6*p* and 6*y* are disposed in a loop-shaped closed magnetic circuit constituted by the first yoke 3, the first magnet 4, the second magnet 7, and the second yoke 8, as shown in FIGS. 2 and 4.

For this reason, when current is supplied to the winding portions 6*a* of the coils 6*p* and 6*y*, the coils 6*p* and 6*y*, the lens support frame 1, and the image-stabilizing lens L1 are driven in a pitch direction (P) and a yaw direction (Y) of the directions orthogonal to the optical axis.

This is because a vibration detecting unit (for example, including an acceleration sensor and an integration circuit; not shown) mounted in the optical device detects vibration of the optical device as a pitch component and a yaw component. The pitch direction and the yaw direction respectively refer to a vertical direction and a horizontal direction.

For example, the above-described vibration detecting unit generates vibration information about the actual amounts of vibration in the pitch and yaw directions during a first period after a first trigger signal is output. Herein, "during a first period" conceptually includes a period from when a first trigger signal is output to when a second trigger signal is output.

Vibration information generated by the vibration detecting unit is output, for example, to the camera CPU 201, or the lens CPU 301 and the image-stabilizing unit 305. The vibration information serves as a parameter for controlling the center position of the image-stabilization driving range of the image-stabilizing lens L1.

First, image stabilization can be performed by controlling the above-described center position to be within the range from the optical axis of the image-stabilizing lens L1, which is held by gravity on resilient members (for example elastic members such as compression coil springs) that will be described below, to the optical axis of the image-capturing system.

Secondly, the center position can be controlled with reference to a state in which the image-stabilizing lens L1 is held on the resilient members by gravity when a first vibration output (vibration amount) from the vibration detecting unit is less than or equal to a first output value.

Thirdly, the center position can be controlled with reference to a state in which the image-stabilizing lens L1 is lifted toward the optical axis of the image-capturing optical system from the position where it is held on the resilient members by gravity when a second vibration output from the vibration detecting unit is more than the first vibration output.

A driving source for driving the lens support frame (lens holding member) 1 in the directions orthogonal to the optical axis is constituted by the first yoke 3, the magnets 4*p*, 4*y*, 7*p*, and 7*y*, the second yoke 8, and the coils 6*p* and 6*y*.

During image stabilization, for example, the driving source drives the lens support frame 1 under control of the lens CPU 301 or the image-stabilizing unit 305 so as to control the center position of the image-stabilization driving range of the image-stabilizing lens L1 according to the above-described vibration information.

Current is supplied from a flexible circuit board (not shown) to the coils 6*p* and 6*y*. Various electronic components necessary for controlling the device are mounted on the circuit board (part of the driving source).

The circuit board is fixed to the front side of the second yoke 8 or the rear side of the base member 2. A connecting portion extends from the circuit board so as to allow connection to another circuit board.

As shown in FIGS. 2 and 3, an extending portion 2h is provided in the base member 2, and serves to receive the connecting portion. The connecting portion is fixed to the extending portion 2h, for example, with double-sided tape.

For example, the circuit board operates according to a control command from the lens CPU 301 or the image-stabilizing unit 305. That is, the circuit board can perform image stabilization.

The circuit board can have a direct function of controlling the center position of the image-stabilization driving range of the image-stabilizing lens L1 according to vibration information obtained during the first period between the output of the first trigger signal and the output of the second trigger signal.

The circuit board (control circuit) includes, for example, control circuits 44p and 44y shown in FIG. 4.

The control circuit 44p includes a detecting circuit 15p for detecting vibration information, a calculating circuit 16p for calculating the control amount for image stabilization, a filter 17p for removing unnecessary signals, and a driving circuit 18p for driving the above-described driving source in accordance with the control amount.

Similarly, the control circuit 44y includes a detecting circuit 15y for detecting vibration information, a calculating circuit 16y for calculating the control amount for image stabilization, a filter 17y for removing unnecessary signals, and a driving circuit 18y for driving the above-described driving source in accordance with the control amount.

The detecting circuits 15p and 15y, the calculating circuits 16p and 16y, and the driving circuits 18p and 18y can process information about driving control other than information about image stabilization, for example, can control the aperture, focusing, or the like.

As shown in FIGS. 2 to 4, compression coil springs 9pa and 9pb serving as elastic members are provided at two positions between the lens support frame 1 and the base member 2. The lens support frame 1 is clamped between the compression coil springs 9pa and 9pb in the pitch direction.

Further, compression coil springs 9ya and 9yb serving as elastic members are provided at two positions between the lens support frame 1 and the base member 2. The lens support frame 1 is clamped between the compression coil springs 9ya and 9yb in the yaw direction.

End faces of the compression coil springs 9pa, 9pb, 9ya, and 9yb close to the optical axis are in contact with flat portions 1d serving as bottom faces of recesses provided in the lens support frame 1.

A projection 1e is provided on each of the flat portions 1d, and is fitted in the corresponding coil spring, so that the coil spring is prevented from falling off the flat portion 1d.

End faces of the compression coil springs 9pa, 9pb, 9ya, and 9yb remote from the optical axis are in contact with flat portions 2i serving as bottom faces of recesses provided in the base member 2, as shown in FIGS. 2 and 3.

A projection 2j is provided on each of the flat portions 2i, and is fitted in the corresponding coil spring, so that the coil spring is prevented from falling off the flat portions 2i.

In an assembled state shown in FIGS. 3 and 4, the compression coil springs 9pa, 9pb, 9ya, and 9yb are compressed so as to suspend the lens support frame 1.

The image-stabilizing unit 305 includes a position detecting unit (not shown) that detects the position of the image-stabilizing lens L1. For example, the position detecting unit can include a position detecting target member, a photoreflector, and so on, as disclosed in Japanese Patent Laid-Open No. 11-212133. Alternatively, the position detecting unit can include a light-emitting element, such as an LED, and a photoreceptor such as a PSD, as disclosed in Japanese Patent Laid-Open No. 2005-227329.

The voltage (power) input to the coils 6p ad 6y is determined corresponding to a target driving value for image stabilization. The target driving value is set on the basis of detection output (vibration information) from the above-described vibration detecting unit and detection output from the position detecting unit.

The compression coil springs 9pa, 9pb, 9ya, and 9yb have a linear characteristic, and the relationship between the target input value (voltage) to the coils 6p and 6y and the produced thrust has also a linear characteristic.

For this reason, it is preferable to recognize the elastic constants of the compression coil springs 9pa, 9pb, 9ya, and 9yb (elastic forces corresponding to displacement) and the thrust constants of the coils 6p and 6y (thrust corresponding to input voltage) beforehand. By adjusting the input voltage to the coils 6p and 6y in accordance with the elastic constants and the thrust constants, the image-stabilizing lens L1 can be shifted by a desired amount. Therefore, the position detecting unit that detects the position of the image-stabilizing lens L1 can be omitted.

In the above-described configuration of the first embodiment, a lock mechanism for locking the image-stabilizing lens L1 at a predetermined initial position can be omitted, unlike the known image-stabilizing unit.

Further, components of a rolling preventing mechanism for preventing the tilting of the image-stabilizing lens L1 relative to the optical axis can also be omitted. This allows a sufficient image stabilizing function to be achieved with a considerably simpler structure.

Figure 5:
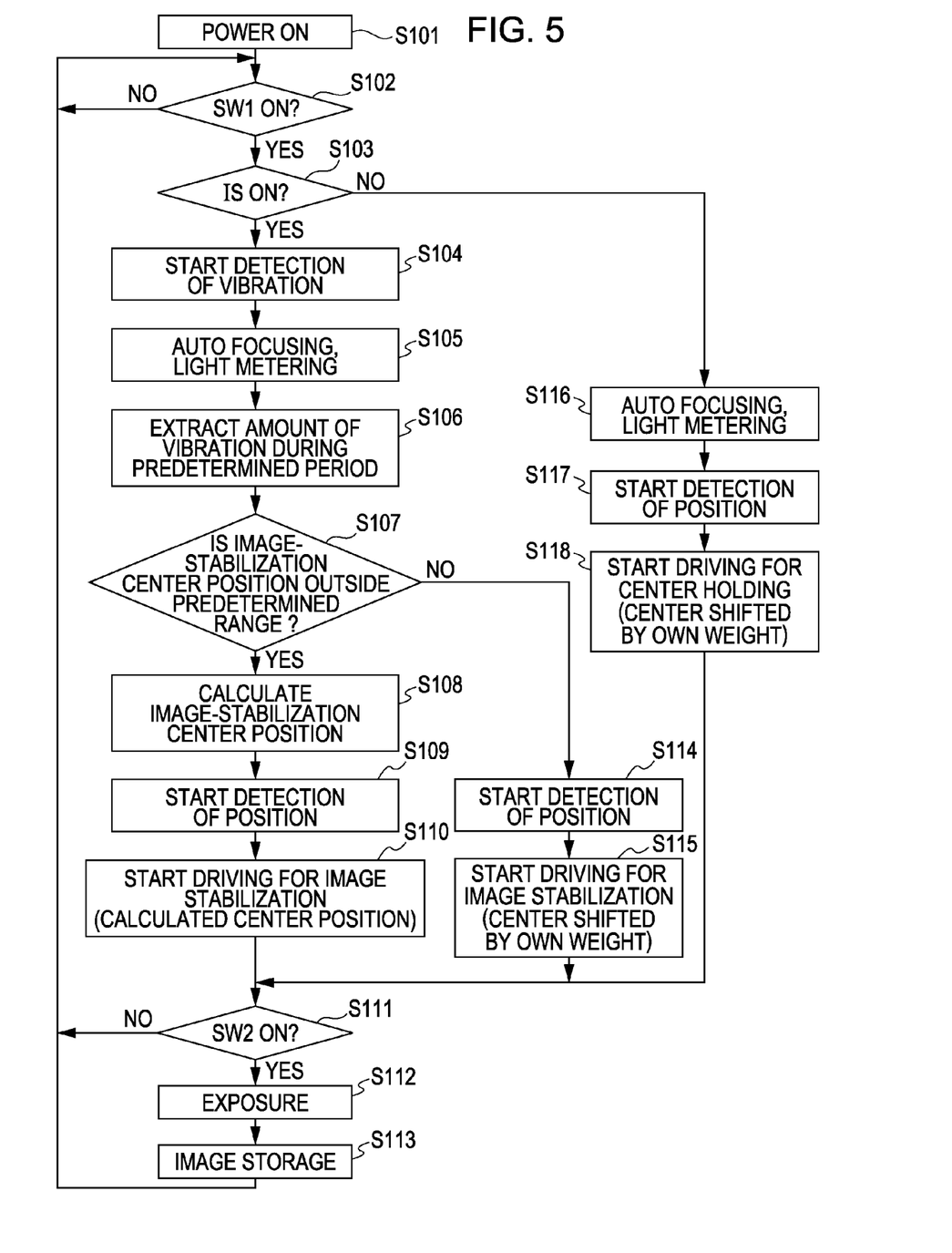
FIG. 5 is a flowchart showing an image stabilizing procedure in the first embodiment.

A description will be given of an example of an image-capturing procedure performed when the lens body 300 including the image-stabilizing unit 305 with the above-described structure is attached to the camera body 200, with reference to FIG. 5 as a flowchart.

First, after the camera body 200 is powered on (Step S101), it is determined whether a first trigger signal SW1 for an image-capturing preparatory state has been output (Step S102).

When the signal SW1 has been output, it is determined whether the IS switch 303 for image stabilization is ON (Step S103). If so, detection of the vibration amount is started with a sensor such as a vibrating gyroscope (vibration detection start) (Step S104).

After auto focusing and light metering are performed (Step S105), the vibration detection unit detects the vibration amount during a first period (Step S106), and it is determined whether the image-stabilization center position calculated from the vibration amount is outside a predetermined range (Step S107).

When the image-stabilization center position is outside the predetermined range, the center position of the image stabilization range is calculated (Step S108), and detection of the position of the image-stabilizing lens L1 is started (Step S109). Then, the image stabilization range is moved to the calculated center position, and driving for image stabilization is started (Step S110).

Steps S106 to S110 will now be described in more detail. The vibration amount detected by a sensor such as a vibrating gyroscope (in actuality, the output from the sensor, or the value representing the vibration amount calculated on the basis of the output) are extracted.

In this case, immediately after the first stroke switch is turned on (a first trigger signal SW1 is output), extraction of vibration amounts in a predetermined period is started (S106).

For example, the predetermined period refers to a period taken until the second stroke switch is turned on (a second trigger signal SW2 is output).

The center position of an image stabilization range for correcting the largest vibration, of the extracted vibration amounts, is compared with a predetermined range stored in the storage unit 207 of the camera body 200, and it is determined whether the center position is outside the predetermined range (Step S107).

When the center position is outside the predetermined range, the amount of shift of the center position of the image stabilization range is calculated (Step S108).

Figure 6:
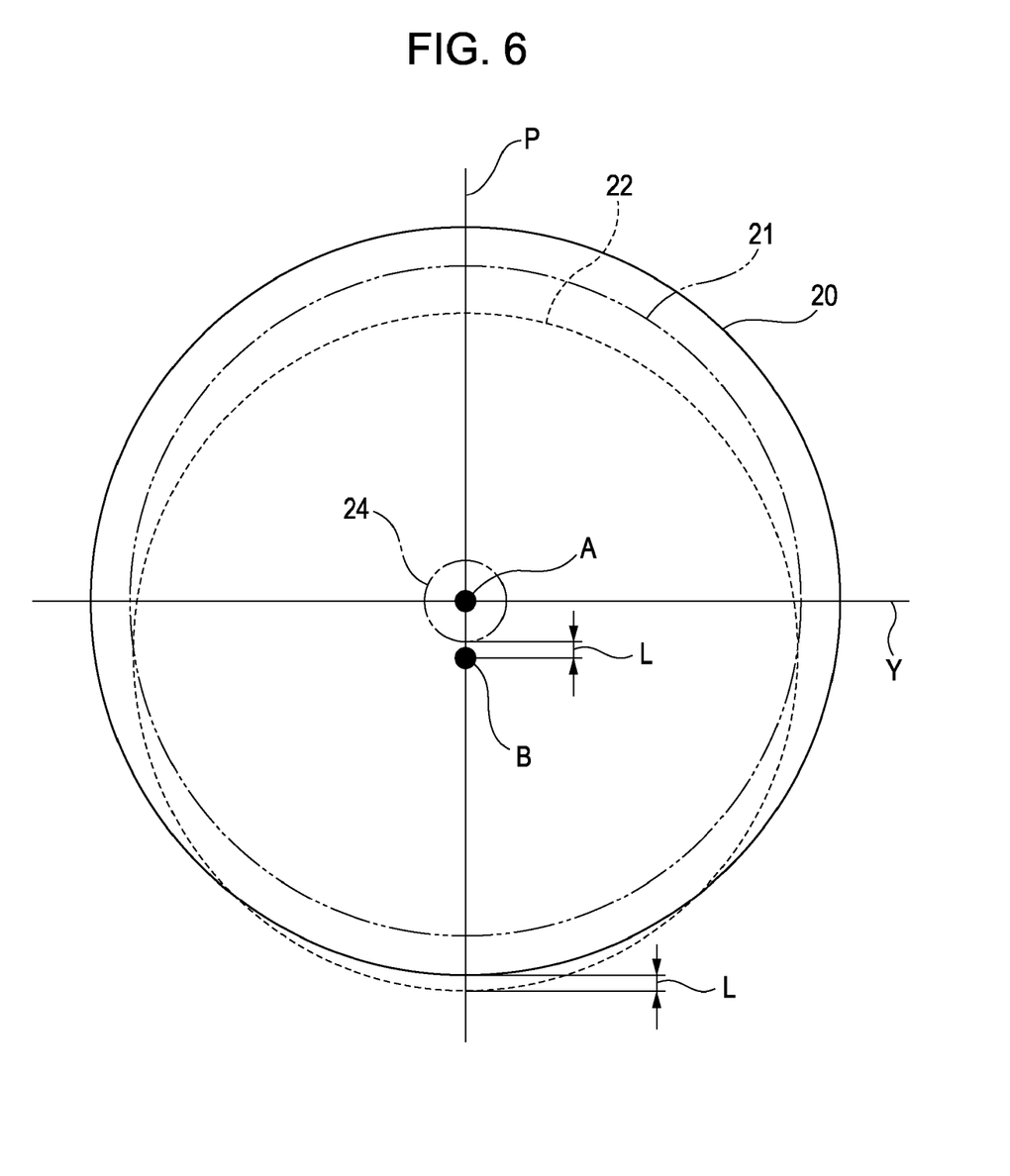
FIG. 6 is a conceptual view showing an example of an image-stabilization driving range, as viewed in the direction of the optical axis of an image-capturing system in the first embodiment.
Figure 7:
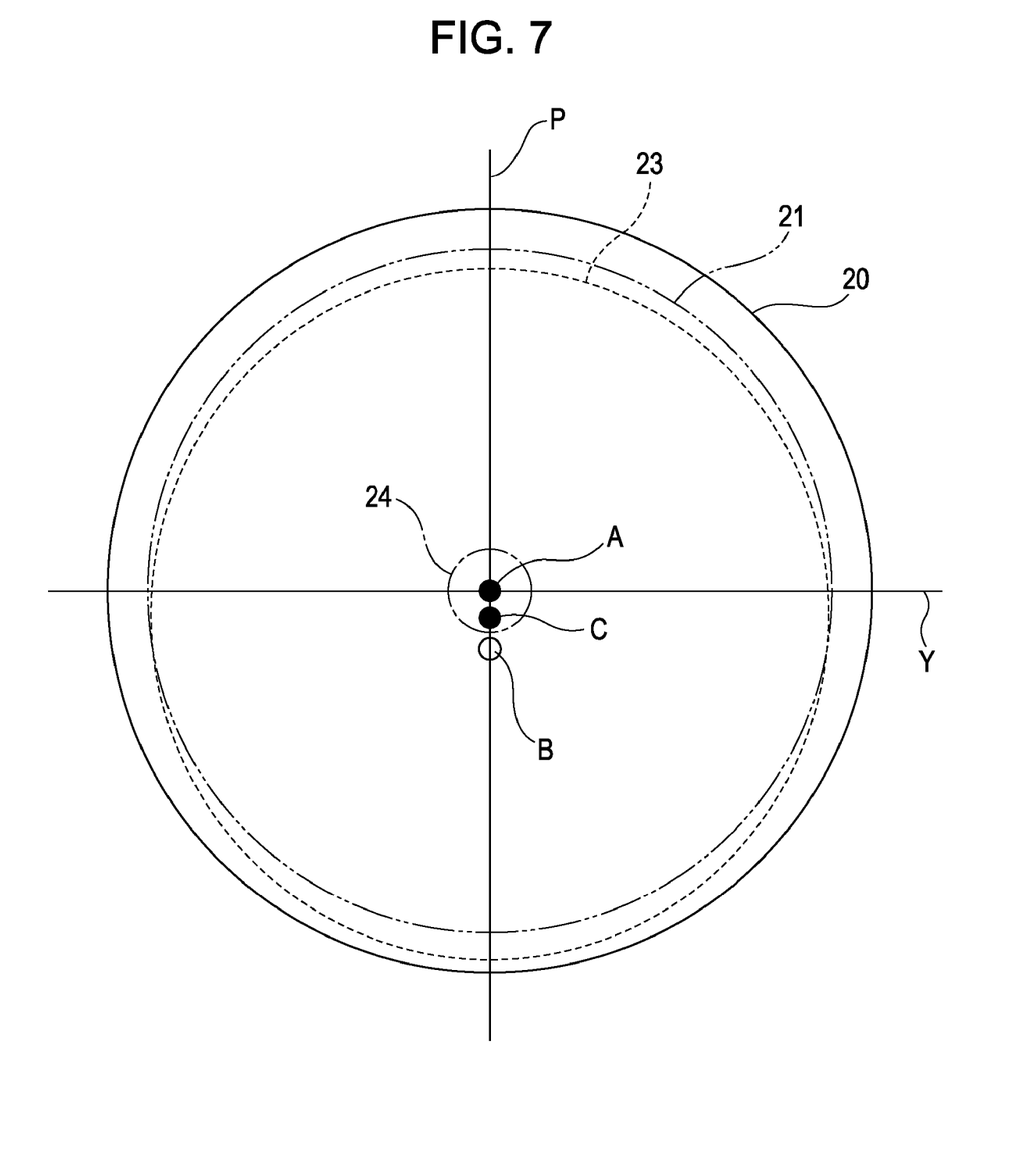
FIG. 7 is a conceptual view showing another example of an image-stabilization driving range, as viewed in the direction of the optical axis of the image-capturing system in the first embodiment.

A detailed description will be given of a method for calculating the amount of shift of the center position of the image stabilization range with reference to FIGS. 6 and 7. FIGS. 6 and 7 conceptually show image stabilization ranges, as viewed from the optical axis of the image-capturing optical system.

In FIGS. 6 and 7, the horizontal axis represents the yaw direction Y, and the vertical axis represents the pitch direction P. An image-stabilization possible range 20 means a range in which the optical axis of the image-stabilizing lens L1 can move. For example, this range 20 is a regulated mechanical moving range.

During actual image stabilization, the driving source performs driving within a range slightly narrower than the image-stabilization possible range 20, for example, image stabilization ranges (ranges in which the optical axis of the image-stabilizing lens L1 moves for image stabilization) 21, 22, and 23 in FIGS. 6 and 7.

For example, these actual ranges are regulated electronic moving ranges. In FIGS. 6 and 7, points A, B, and C respectively show the center positions of the image stabilization ranges 21, 22, and 23. A range 24 will be described below.

In an example shown in FIG. 6, the center position A substantially coincides with the optical axis, and the image stabilization range 21 is provided inside (smaller than) the image-stabilization possible range 20.

In this state, it is necessary to continue power supply in order to hold the image-stabilizing lens L1 at the optical center against gravity. This increases power consumption.

However, in the image-stabilizing unit 305 of the first embodiment, the image-stabilizing lens L1 is suspended at a position such that the optical axis thereof is slightly shifted from the optical axis of the image-capturing optical system in the gravitational direction because of the weight of the image-stabilizing lens L1. Therefore, by setting this position as the center position of the image stabilization range, the necessity of continuing power supply for holding the image-stabilizing lens L1 at the optical center against gravity is removed. This advantageously reduces power consumption.

Since the image-stabilizing lens L1 is suspended with its own weight, the image stabilization range in the gravitational direction is narrow. For example, in a case in which the center position is at B when the image-stabilizing lens L1 is suspended, the image stabilization range protrudes from the image-stabilization possible range 20 by L.

For this reason, when a large vibration occurs, it cannot be corrected completely. This may lower the quality of a captured image.

Accordingly, extraction of the vibration amounts is started immediately after a first trigger signal SW1 is output, and the vibration amounts in the predetermined period are extracted. Then, the center position of the image stabilization range for correcting the largest one of the extracted vibration amounts is calculated.

When the image stabilization amount serving as a first vibration output is less than or equal to a predetermined value, the center position is controlled with reference to a state in which the image-stabilizing lens L1 is held on the elastic members by gravity.

When the center position is outside the predetermined range stored in the camera, the image-stabilizing lens L1 is lifted toward the optical axis so that the center position of the image stabilization range comes within the predetermined range.

More specifically, image stabilization can be performed in a first mode. That is, the center position is controlled to be within the range between the optical axis of the image-stabilizing lens L1, which is held on the elastic members (compression coil springs) by gravity, and the optical axis of the image-capturing optical system.

Alternatively, in a second mode, the center position is controlled with reference to a state in which the image-stabilizing lens L1 is held on the elastic members by gravity when the first vibration output (vibration amount) from the vibration detecting unit is less than or equal to the first output value.

Alternatively, in a third mode, the center position is controlled with reference to a state in which the image-stabilizing lens L1 is lifted toward the optical axis from the position such as to be held on the elastic members by gravity when the second vibration output from the vibration detecting unit is larger than the first vibration output.

When calculating the center position of the image stabilization range when the largest vibration is corrected, the center position of the widest image-stabilization range that allows correction of the largest vibration is calculated so as to minimize the amount of lifting of the image-stabilizing lens L1 toward the optical axis. This further reduces power consumption.

The predetermined range stored in the camera is a range 24 shown in FIGS. 6 and 7. As long as the center position is within this range 24, the image stabilization range does not come out of the image-stabilization possible range 20.

FIG. 7 shows an image stabilization range 23 adopted when the center position is shifted (lifted) from B to C. The center position C is within the predetermined range 24, and the image stabilization range 23 is within the image-stabilization possible range 24.

For this reason, even a large vibration can be corrected. By setting the center position C, to which the center position is lifted, as close as possible to the border within the predetermined range 24, power consumption can be made lower than in the case in which the center position is lifted to the optical axis.

In the above, extraction is started immediately after the first trigger signal SW1 is output, and the vibration amounts in the predetermined period are extracted. Then, the center position of the image stabilization range is calculated when the largest vibration is corrected.

When the second trigger signal SW2 is output while the vibration amounts are being extracted, the largest vibration amount that has been obtained before, or the average value of the vibration amounts extracted during the first period can be adopted.

The first period in which the vibration amounts are extracted can be a period taken from when the first trigger signal SW1 is output to when the second trigger signal SW2 is output. In this case, much vibration information can be obtained, and the center position of the image stabilization range can be set more properly.

Extraction of the vibration amounts can be started when some waiting time has passed after the first trigger signal SW1 is output. The vibration amount is less stable immediately after the first trigger signal SW1 is output than immediately before the image-capturing operation. Therefore, in this case, the center position of the image stabilization range can be set more reliably.

While the vibration state after the output of the first trigger signal SW1 can be properly checked in this way, the method for calculating the center position of the image stabilization range is not limited to the above-described methods.

Referring to FIG. 5 again, when the vibration correction amount does not exceed the predetermined value in Step S107, detection of the position of the image-stabilizing lens L1 is started (Step S114).

Driving for image stabilization is started while the center position of the image stabilization range is set at the position where the optical axis of the image-stabilizing lens L1 is slightly shifted from the optical axis of the image-capturing optical system by its own weight in the gravitational direction (natural position of the image-stabilizing lens L1 suspended by the coil springs) (Step S115).

Driving power for image stabilization is roughly divided into two types of powers, namely, power for holding the moving member at the optical center against gravity, and power for shifting the moving member from the optical center for image stabilization.

Since the image-stabilizing lens L1 is originally suspended by the springs, power consumption can be reduced by setting the center of shifting for image stabilization at the position where the image-stabilizing lens L1 is slightly shifted relative to the optical axis by its own weight in the gravitational direction (natural position).

For this reason, power for image stabilization driving can be saved, and power consumption decreases as the image-stabilizing lens L1 moves from the optical axis toward the natural position. Therefore, the amount of lifting of the image-stabilizing lens L1 from the natural position is minimized, and power consumption can be further reduced.

Then, it is determined whether a second trigger signal SW2 has been output (Step S111). When the second trigger signal SW2 has been output, exposure is performed (Step S112), an image is stored (Step S113), and the image-capturing process is completed. In contrast, when the second trigger switch SW2 has not been output, Step S102 is performed again.

When the IS switch 303 is OFF in Step S103, auto focusing and light metering are performed, similarly to Step S105 (Step S116), and position detection is started, similarly to Step S109 (Step S117).

Then, driving is started so that the image-stabilizing lens L1 is held at the position (natural position) slightly shifted from the optical axis in the gravitational direction (driving for center holding) (Step S118).

Subsequently, it is determined whether the second trigger signal SW2 has been output (Step S111). If so, the above-described Step S112 and subsequent steps are performed. If not, Step S102 is performed again.

As described above, the center position of the image stabilization range is controlled on the basis of the vibration state after the first trigger signal SW1 is output. Therefore, even when an unexpectedly large vibration occurs between the image-capturing preparatory state and the image-capturing operation, image stabilization can be performed properly.

That is, since the center position of the image stabilization range is controlled on the basis of the vibration state after the first trigger signal SW1 is output, a sufficient image-stabilizing stroke can be obtained even when correcting a large vibration. This enhances the image-stabilizing performance and improves the quality of captured images.

The center position of the image stabilization range is normally set at the natural position, and the image stabilization range can be ensured with the minimum power when a large vibration is detected. From this viewpoint, power saving can be achieved.

Second Exemplary Embodiment

A Second exemplary embodiment of the present invention will now be described.

While the vibration amounts are extracted during a predetermined time immediately after the first trigger signal SW1 is output in the above-described first exemplary embodiment, if a relatively long time elapses after the signal SW1 is output, information about vibration immediately after the output of the signal SW1 becomes old, and the vibration state indicated by the information may differ from the state during an image-capturing operation.

Accordingly, in the second exemplary embodiment, after a second trigger signal SW2 is output, the preceding vibration state is extracted. The second exemplary embodiment will be described in detail with reference to FIG. 8 serving as a flowchart.

Figure 8:
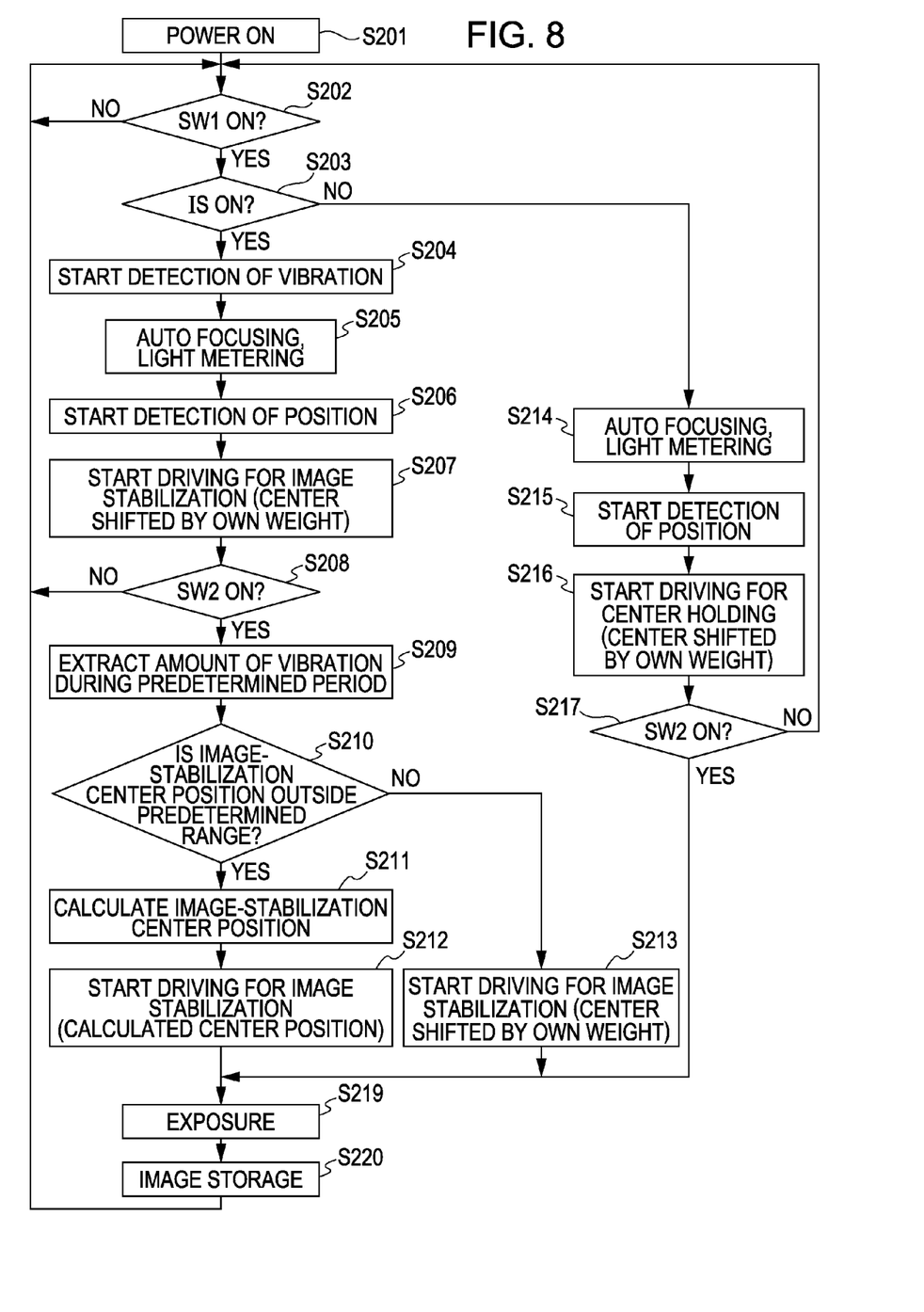
FIG. 8 is a flowchart showing an image stabilizing procedure according to a second embodiment of the present invention.

First, when a camera body 200 is powered on (Step S201), it is determined whether a first trigger signal SW1 for an image-capturing preparatory state has been output (Step S202).

When the first trigger signal SW1 has been output, it is determined whether an IS switch 303 is ON (Step S203). When the IS switch 303 is ON, detection of the vibration amount is started with a sensor such as a vibrating gyroscope (vibration detection) (Step S204).

Subsequently, auto focusing and light metering are performed (Step S205), and the position of an image-stabilizing lens L1 is detected (Step S206).

Then, driving for image stabilization is started while the center position of an image stabilization range is set at a position where the optical axis of the image-stabilizing lens L1 is slightly shifted from the optical axis of an image-capturing optical system in the gravitational direction by the weight of the image-stabilizing lens L1 (natural position of the image-stabilizing lens L1 suspended by coil springs) (Step S207).

Then, it is determined whether a second trigger signal SW2 has been output (Step S208). When the signal SW2 has been output, the vibration amount during a first period is extracted (Step S209). When the signal SW2 has not been output, Step S202 is performed again.

It is determined whether the image-stabilization center position calculated from the vibration amount is outside a predetermined range (Step S210). When the image-stabilization center position is out of the predetermined range, the center position of the image stabilization range is calculated (Step S211).

Then, the image stabilization range is shifted to the calculated center position, and image stabilization (image-stabilization driving) is started (Step S212).

Steps S209 to S212 will be described in more detail. First, the vibration amount detected by the sensor, such as a vibrating gyroscope (in actuality, the output value from the sensor or the value indicating the vibration amount calculated from the output value) is extracted.

In this case, immediately after the second trigger signal SW2 is output, the vibration amounts during the preceding predetermined period are extracted. The center position of an image stabilization range for correcting the largest vibration is compared with a predetermined range stored in the camera.

As a result of comparison, when the center position is out of the predetermined range, the shift amount of the center position of the image stabilization range is calculated. Calculation is performed in the same manner as that adopted in the first exemplary embodiment described with reference to FIGS. 6 and 7.

Herein, immediately after the second trigger signal SW2 is turned on, vibration amounts during the preceding predetermined period are extracted, and the center position of the image stabilization range adopted when the largest vibration is corrected is calculated.

Alternatively, only vibration amounts more than the predetermined value can be further extracted from the extracted vibration amounts, and the average value thereof can be adopted. The average value of all vibration amounts extracted during the first period can be adopted.

In short, the calculation method is not limited to the above-described methods as long as the vibration state immediately before the output of the second trigger signal SW2 (or immediately before exposure) can be checked, and the center position of the image stabilization range can be calculated.

When the vibration correction amount is less than or equal to the predetermined value in Step S210 shown in FIG. 8, the center position of the image stabilization range is set at the position where the optical axis of the image-stabilizing lens L1 is slightly shifted from the optical axis of the image-capturing optical system in the gravitational direction by the weight of the image-stabilizing lens L1 (natural position of the image-stabilizing lens L1 in a suspended state).

That is, when the vibration correction amount serving as the first vibration output is less than or equal to the predetermined value, the center position is controlled with reference to the state in which the image-stabilizing lens L1 is held on the elastic members by gravity.

Then, driving for image stabilization is started while the center position of the image stabilization range is set at the position where the optical axis of the image-stabilizing lens L1 is slightly shifted from the optical axis of the image-capturing optical system in the gravitational direction by the weight of the image-stabilizing lens L1 (natural position of the image-stabilizing lens L1 in a suspended state) (Step S213).

Subsequently, exposure is performed (Step S219), an image is stored (Step S220), and the image-capturing process is completed.

Since the image-stabilizing lens L1 is originally suspended by the springs, power consumption can be reduced by performing driving with reference to the position where the image-stabilizing lens L1 is slightly shifted from the optical axis by its own weight in the gravitational direction (natural position).

For this reason, power for image-stabilizing driving can be saved, and power consumption decreases as the image-stabilizing lens L1 moves from the optical axis toward the natural position. Therefore, the amount of lifting of the image-stabilizing lens L1 from the natural position is minimized, and power consumption can be further reduced.

When the IS switch 303 is OFF in Step S203, auto focusing and light metering are performed, similarly to Step S205 (Step S214), and position detection is started, similarly to Step S206 (Step S215).

Then, driving is started so that the image-stabilizing lens L1 is held while being slightly shifted from the optical axis in the gravitational direction by its own weight (start of driving for center holding) (Step S216).

Next, it is determined whether a second trigger signal SW2 has been output (Step S217). When the signal SW2 has been output, Step S219 is performed. When the signal SW2 has not been output, Step S202 is performed again.

In the above-described procedure, the center position of the image stabilization range is controlled on the basis of information about vibration immediately before exposure which is close in time to vibration during exposure. Therefore, a sufficient image-stabilizing stroke can be more reliably obtained even when correcting a large vibration. This enhances the image-stabilizing performance and improves the quality of captured images.

The center position of the image stabilization range is set at the natural position in normal cases, and the image stabilizing range is ensured with the minimum power when a large vibration is detected. This can reduce power consumption.

While the present invention has been described above with reference to the exemplary embodiments, it is to be understood that the invention is not limited to the disclosed exemplary embodiments. The scope of the following claims is to be accorded the broadest interpretation so as to encompass all modifications, equivalent structures and functions.

For example, in a camera having different image-quality modes or different power consumption modes, when a high image-quality mode is selected, image stabilization can be performed while the center position of the image stabilization range is always set near the optical axis.

In a standard or low-image quality mode, or a power saving mode, image stabilization can be performed with the methods according to the present invention. In this case, it is possible to meet various user's demands.

According to the above-described exemplary embodiments, the center position of the image-stabilization driving range of the image-stabilizing lens is controlled on the basis of vibration information obtained during the first period taken from when the first trigger signal is output to when the second trigger signal is output.

For this reason, it is unnecessary to continue power supply for holding the image-stabilizing lens at the optical center against gravity. From this viewpoint, the image stabilization range can be ensured with the minimum power. This reduces power consumption, and increases the number of images that can be captured with the same battery capacity.

Further, according to the above-described exemplary embodiments, the center position is controlled to be within the range between the optical axis of the image-stabilizing lens, which is held on the elastic members by gravity, and the optical axis of the image-capturing optical system.

That is, since the center of the image stabilization range is controlled on the basis of the state of the image-stabilizing lens influenced by gravity, a sufficient image-stabilizing stroke can be obtained even when correcting an unexpectedly large vibration. Accordingly, high image-stabilizing performance and high-quality captured images can be achieved.

Moreover, the center position of the image stabilization range is set at the natural position in normal cases, and the image-stabilizing range is ensured with the minimum power when a large vibration is detected. Therefore, power consumption is reduced.

Further, when the first vibration output from the vibration detecting unit is less than or equal to a first output value, the center position is controlled with reference to the position where the image-stabilizing lens is held on the elastic members by gravity.

When the second vibration output is more than the first vibration output, the center position is controlled with reference to the position where the image-stabilizing lens is lifted up toward the optical axis of the image-capturing optical system from the position held on the elastic members by gravity.

Therefore, even when an unexpectedly large vibration is caused between the image-capturing preparatory state and the image-capturing operation, the image stabilization range is ensured, image stabilization is properly performed, and high-quality images can be captured in various image-capturing conditions.

Moreover, driving for image stabilization is performed with reference to the position where the image-stabilizing lens is shifted from the optical axis in the gravitational direction by its own weight (natural position). Therefore, power consumption can be reduced, and driving for image stabilization can be performed with less power.

In particular, even when the second vibration output is high, power consumption decreases as the image-stabilizing lens moves from the optical axis toward the natural position, and the amount of lifting of the image-stabilizing lens from the natural position can be minimized. From this viewpoint, power consumption can also be reduced.

This application claims the benefit of Japanese Application No. 2006-213782 filed Aug. 4, 2006, which is hereby incorporated by reference herein in its entirety.

What is claimed is:

1. An optical device comprising:
    a base member;
    an image-stabilizing lens;
    a lens holding member mounted to the base member and configured to hold the image-stabilizing lens;
    a driving unit configured to drive the lens holding member in a direction orthogonal to an optical axis;
    a plurality of elastic members fixed between the base member and the lens holding member;
    a vibration detecting unit configured to detect vibration; and
    a control circuit configured to control the position of the lens holding member on the basis of vibration information from the vibration detecting unit,
    wherein the center position of the driving range of the image-stabilizing lens is controlled on the basis of vibration information obtained during a predetermined period between the time when a first trigger signal is input and the time when a second trigger signal is input.

2. An optical device as claimed in claim 1, wherein the center position is controlled to be within a range between the optical axis of the image-stabilizing lens and the optical axis of the image-capturing optical system in a state in which the image-stabilizing lens is held on the elastic members by gravity.

3. An optical device as claimed in claim 2, wherein the center position is controlled with reference to a position of the image-stabilizing lens held on the elastic members by gravity when a first vibration output from the vibration detecting unit is less than or equal to a first output value, and is controlled with reference to a position of the image-stabilizing lens lifted from the position held on the elastic members by gravity toward the optical axis of the image-capturing optical system when a second vibration output from the vibration detecting unit is larger than the first vibration output.

4. A camera system comprising:
    an interchangeable lens; and
    a camera on which the interchangeable lens is detachably mounted,
    wherein the interchangeable lens includes:
    a base member;
    an image-stabilizing lens;
    a lens holding member mounted to the base member and configured to hold the image-stabilizing lens;
    a driving unit configured to drive the lens holding member in a direction orthogonal to the optical axis;
    a plurality of elastic members fixed to the base member and the lens holding member;
    a vibration detecting unit configured to detect vibration; and
    a control circuit configured to control the position of the lens holding member on the basis of vibration information from the vibration detecting unit,
    wherein the camera includes:
    a release switch configured to output a first trigger signal indicating an image-capturing preparatory state, and a second trigger signal indicating an image capturing state, and
    wherein the interchangeable lens controls the center position of the driving range of the image-stabilizing lens on the basis of vibration information obtained during a predetermined period between the time when the first trigger signal is output and the time when the second trigger signal is output.

5. A camera system as claimed in claim 4, wherein the center position is controlled to be within a range between the optical axis of the image-stabilizing lens and the optical axis of the image-capturing optical system in a state in which the image-stabilizing lens is held on the elastic members by gravity.

6. A camera system as claimed in claim 5, wherein the center position is controlled with reference to a position of the image-stabilizing lens held on the elastic members by gravity when a first vibration output from the vibration detecting unit is less than or equal to a first output value, and is controlled with reference to a position of the image-stabilizing lens lifted from the position held on the elastic members by gravity toward the optical axis of the image-capturing optical system when a second vibration output from the vibration detecting unit is larger than the first vibration output.

* * * * *